United States Patent [19]

Massaro

[11] Patent Number: 4,573,749

[45] Date of Patent: Mar. 4, 1986

[54] MODULAR STORAGE RACK FOR TAPES

[76] Inventor: Vito Massaro, 200 Seahorse Ct., Marco Island, Fla. 33937

[21] Appl. No.: 544,133

[22] Filed: Oct. 21, 1983

[51] Int. Cl.[4] .................................... A47B 81/06
[52] U.S. Cl. ...................................... 312/12; 312/10; 312/111
[58] Field of Search .............. 312/10, 12, 13, 333; 211/40, 41, 94; 220/346, 351; 217/62; 206/387

[56] References Cited

U.S. PATENT DOCUMENTS

| | | | |
|---|---|---|---|
| D. 261,326 | 10/1981 | Bell et al. . | |
| 2,531,737 | 11/1950 | Lyon | 220/346 |
| 3,335,874 | 1/1966 | Levy et al. . | |
| 3,425,568 | 2/1969 | Albright | 211/94 |
| 3,538,724 | 11/1970 | Davenbough | 312/333 |
| 3,556,620 | 1/1971 | Gutierrez . | |
| 3,640,379 | 2/1972 | Weingarden | 206/387 |
| 3,785,482 | 1/1974 | Preston | 206/387 |
| 3,811,745 | 5/1974 | Cylke . | |
| 4,119,200 | 10/1978 | Cassidy et al. | 312/12 |
| 4,148,535 | 4/1979 | Fenwick . | |
| 4,239,109 | 12/1980 | Nielson et al. . | |
| 4,243,279 | 1/1981 | Ackeret | 312/12 |
| 4,285,554 | 8/1981 | Bell et al. . | |
| 4,308,961 | 1/1982 | Kunce | 211/94.5 |

Primary Examiner—William E. Lyddane
Assistant Examiner—Joseph Falk
Attorney, Agent, or Firm—Parkhurst & Oliff

[57] ABSTRACT

A modular storage rack for tapes, wherein the face of the tape cartridges is visible, rather than the edge of the tape cartridges, thereby facilitating identification. The tapes are positioned in the modular storage rack by using an insertion and dropping motion, and a means for locking the tapes within the modular storage rack is provided.

13 Claims, 4 Drawing Figures

MODULAR STORAGE RACK FOR TAPES

BACKGROUND OF THE INVENTION

The present invention relates to a modular device for storing tape cartridges, such as cassette tapes, eight-track tapes, video tapes, etc. in a manner which displays the face of the tape container rather than the side of the container to a potential user. More particularly, the present invention is a modular device for storing various tapes in a storage rack, thereby exposing the face of the tape while maintaining a means for easy accessability to the tape and having a means for locking the stored tapes within the storage rack.

The general idea of attempting to provide a storage rack for books, tapes and the like has been attempted, as indicated, for example, by Levy et al. U.S. Pat. No. 3,335,874, Gutierrez U.S. Pat. No. 3,556,620, Cylke U.S. Pat. No. 3,811,745, Cassidy et al. U.S. Pat. No. 4,119,200, Fenwick U.S. Pat. No. 4,148,535 and Nielson et al. U.S. Pat. No. 4,239,109. However, none of these prior tape storage devices provides the structure and efficient holding and accessing means, as well as locking means, as the present invention provides. Levy discloses a display rack used for books which makes no provision for locking the books in place. Gutierrez discloses a display case for tape cartridges which provides a pivoting holding means allowing one to flip through individual rows. However, no provision is made for displaying the faces of all the tapes at any particular instant. Cylke discloses a cassette carrier which displays the edges of the tapes therein and makes no provision for a cover to lock the tapes in place. Additionally, the tapes can be removed only by a sliding motion. Cassidy discloses a cassette holder which suspends the tape from a horizontal cross member and inhibits one from viewing the face and side of the cassette. Fenwick discloses a bulky storage case used for displaying merchandise. However, no particular provision is made for holding tapes therein. Nielsen discloses a holding case for tapes which are slidably engaged in slots with no provision made for locking tapes therein or displaying the faces of the tapes.

SUMMARY OF THE INVENTION

The present invention overcomes the foregoing drawbacks. It is accordingly an object of this invention to provide a storage rack for tapes which displays the faces of the tapes, rather than the edges of the tapes, provides for easy accessability to the individual tapes and provides a means for safely locking the tapes within the storage rack.

To obtain the above objects, a modular storage rack for tapes is provided and comprises:

a back-holder having an upper ledge projecting from a surface near a top portion of the back-holder, and a lower ledge projecting from a surface near a bottom portion of the backholder;

the back-holder having a runner attached onto or near the top portion of the back-holder;

the back-holder having a jaw means for attaching to a runner portion of another modular storage rack, attached onto or near the bottom portion of the back-holder;

the projecting upper ledge of the back-holder having an angled portion projecting towards said lower edge;

the projecting lower ledge of the back-holder having an angled portion projecting towards said upper ledge; and the projecting lower ledge having a plurality of cut-away portions, located in the horizontal plane of said lower ledge.

BRIEF DESCRIPTION OF THE DRAWINGS

The above objects, features and advantages of the present invention will become more apparent from reading the following description of the preferred embodiments taken in connection with the accompanying drawings, wherein.

DETAILED DESCRIPTION OF THE PREFERRED EMBODIMENTS

Figure 1:
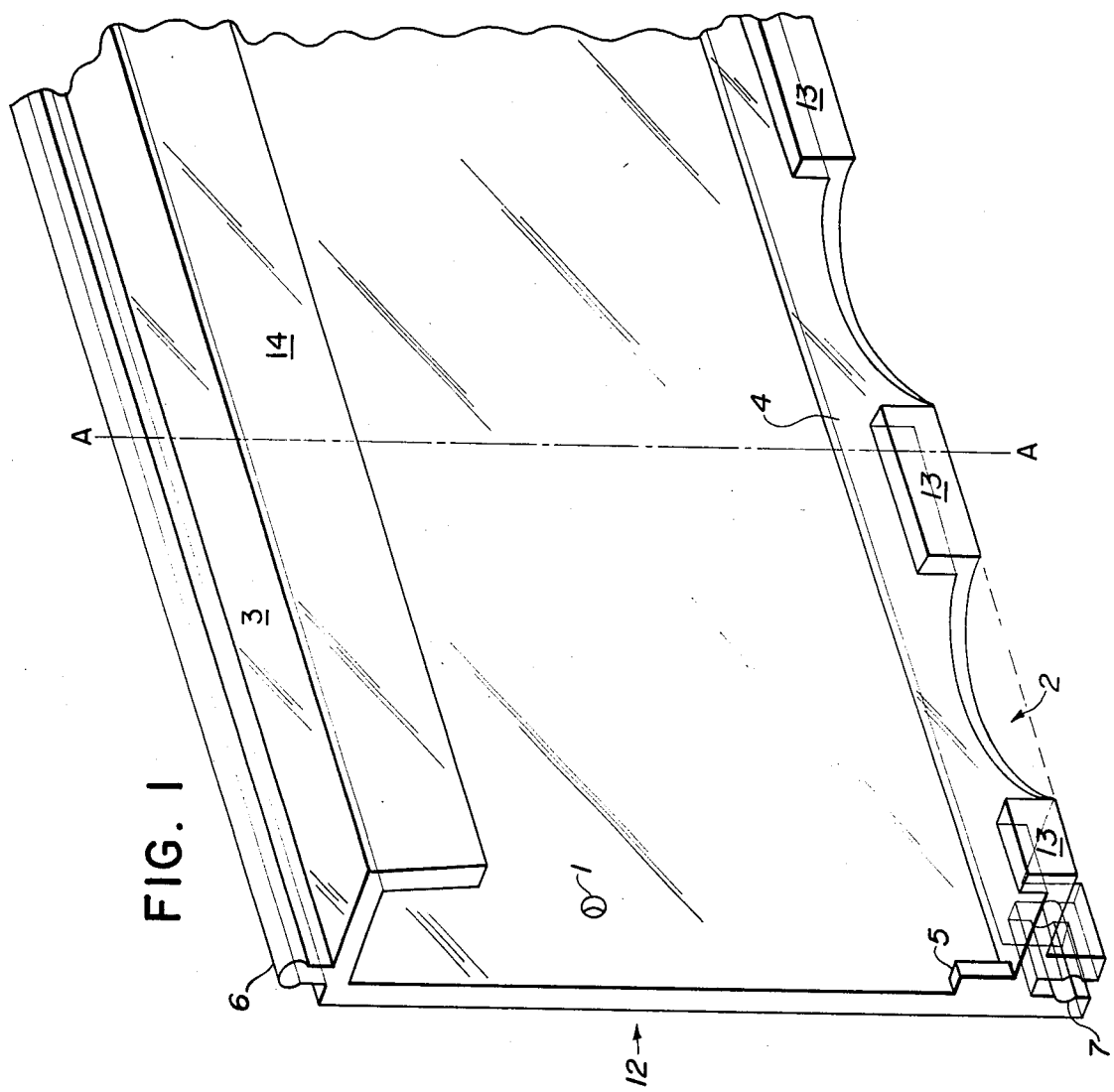
FIG. 1 is a perspective view of a modular storage rack for tapes.
Figure 2:
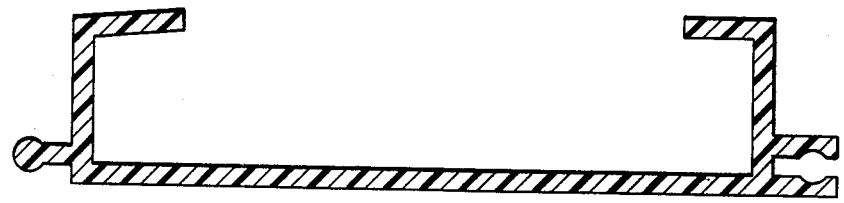
FIG. 2 is a cross-sectional view taken along the line A—A of FIG. 1.

FIGS. 1 and 2 disclose an embodiment of the present invention. The reference numeral 12 corresponds to the backholder which functions to support the back of the tape and additionally supports an upper ledge projecting from the top portion, or a surface near a top portion of the back-holder and a lower ledge projecting from the bottom portion or a surface near a bottom portion of the back-holder. The back-holder can be made of any suitable material such as plastic or metal. However, if the back-holder is manufactured from metal it is preferably placticized by some type of plastic coating to protect the tapes from the metal surfaces.

The upper and lower projecting ledges additionally have angled retainer portions thereon. The angled portion 14 of the upper ledge 3 projects toward the lower edge 4, while the angled portion 13 of the lower ledge 4 projects toward the upper ledge 3. The upper angled portion 14 may form a slight angle with respect to the back-holder 12, e.g., 5° as shown in FIG. 2. These angled portions of the ledge are important in that they retain the tapes desired to be held within the modular storage rack, thereby preventing tapes from sliding off the bottom ledge or preventing the tapes from being removed by pulling on the top of the tapes in a motion which is perpendicular to the plane created by the back-holder.

The lower ledge 4 in FIG. 1, shows a cut-away portion 2 located in the horizontal plane of the lower ledge. The cutaway portion 2 is provided for ease in loading and removing tapes from the modular storage rack. For example, to load a tape into the modular storage rack, one first places an end portion of the tape into the space created by the upper ledge 3, the angled portion 14 and the back-holder 12. By pushing the tape upwards against the upper ledge 3, the modular storage rack is designed so that the bottom of the tape clears the uppermost parts of the angled portion 13 of the lower ledge 4. The user then lets the tape rest against the lower ledge 4 and between the angled portions 13. Hence, the top of the tape is positioned within the space created by the upper ledge 3 and the angled portion 14 and the bottom of the tape is positioned within the space created by the lower ledge 4 and the angled portion 13, with the back side of the tape resting against the back-holder. This construction prevents the tape from being removed without lifting the tape from the bottom by steps in opposite order and directions to those described for insertion of the tape within the modular rack unit.

The cut-away portions 2 are provided to facilitate the placement and removal of the tape within the modular storage rack. The cut-away portions allow one's fingers to be placed into the notch thereby contacting the lower surface of the tape within the modular storage rack. The user then subsequently lifts up and pulls out the bottom of the tape to remove the tape from the rack.

Additionally, FIG. 1 shows a small ledge 5 provided near the longitudinal periphery of the modular storage rack which prevents the tapes from sliding outwards through the sides of the modular storage rack. FIG. 1 shows a small ledge 5 serving this purpose; however, any portion projecting perpendicularly from the plane of the back-holder 12 will serve the same function. Hence, tapes may only be removed and inserted by the aforedescribed procedure.

Additionally, FIG. 1 shows that the cut-away portions 2 do not have any angled portion 13 in front of them. This of course does not have to be the case, because various types of slots may be provided behind the angled portion 13 and totally within the plane of the ledge 4, thereby leaving the entire angled portion 13 intack as a continuous member extending along the longitudinal length of the lower edge portion 4.

FIGS. 1 and 2 further disclose a runner 6 attached near the top portion of the back-holder. The runner 6 is provided as a means for connecting two individual modular storage racks together. The runner 6 is used in combination with a jaw means 7, provided near the bottom portion of the back-holder to connect individual modular storage racks together. The runner 6 can be of any appropriate size and shape and the jaw means 7 has an interior surface corresponding to the outer peripheral surface of the desired shape of the runner 6.

To place two modular storage racks together, one may slidably insert the runner 6 from the modular storage rack into the end of the jaw means 7 of a second modular storage rack and slide until the corresponding edges of each modular storage rack line up in a parallel fashion. A second alternative of attaching two individual modular storage racks together is to press the jaw means 7 over the runner 6, thereby temporarily expanding the jaw means 7 until the runner 6 is properly seated within the slot provided for it. This snapping function rather than sliding function provides for an ease of stacking units in an area where space requirements do not permit slidable engagement between the runner 6 and the slotted means 7. Hence, by following the above-described procedure, any number of modular storage racks may be placed on top of each other.

The back-holder 12 is provided with a plurality of holes 1 for inserting a screw or the like therethrough, thereby holding the back side of the back-holder against another surface. The other surface may be any relatively smooth relatively vertical surface such as a wooden wall or metal surface, depending upon the particular application. The size of the holes need only be large enough to accomodate the screws inserted therethrough.

Figure 3:
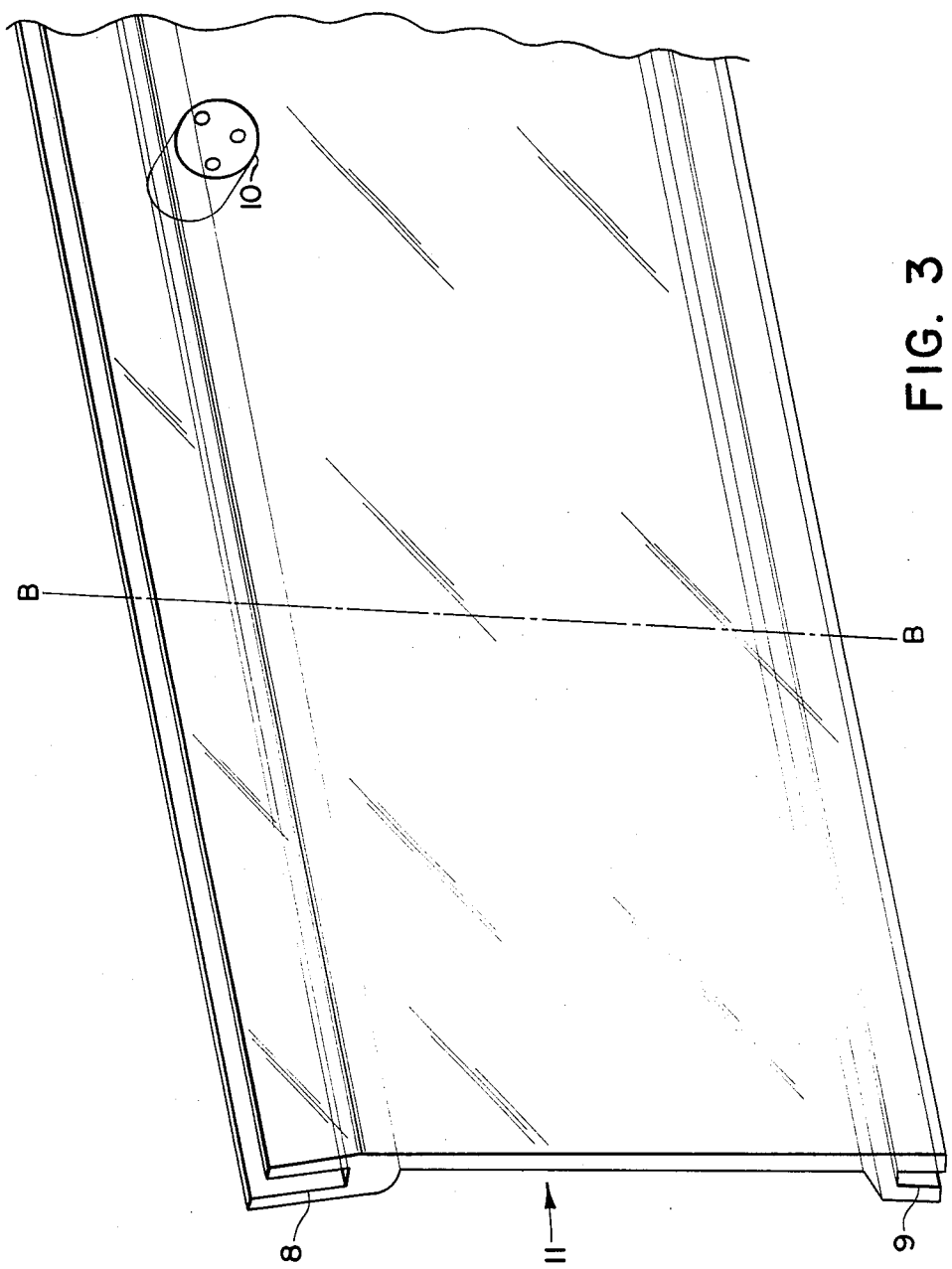
FIG. 3 is a perspective view of a front cover for the modular storage rack for tapes of FIG. 1, according to the present invention.
Figure 4:
FIG. 4 is a cross-sectional view taken along the line B—B of FIG. 3.

FIGS. 3 and 4 disclose a front cover which is slidably attachable to the aforedescribed modular storage rack tape holder. The front cover 11 has an upper notch 8 and a lower notch 9 for attaching to the upper angled portion 14 of the ledge 3 and the lower angled portion 13 of the ledge 4, respectively. The front cover can be made of any transparent material, such as plastic, and is an optional part of the modular storage rack. However, the placement of the front cover upon the aforedescribed modular storage rack provides a means for locking all tapes within the modular storage rack unit.

The front cover is placed upon the modular storage rack by the following procedure. The longitudinal ends of the slots 8 and 9 are positioned near the longitudinal ends of the upper angled portion 14 and the lower angled portion 13 respectively. The front cover then slidably engages the respective angled portions 13 and 14 until the longitudinal ends of the front cover line up with the longitudinal ends of the angled portions 14 and 13 of the upper and lower ledges 3 and 4, respectively. The front cover also is provided with a locking means 10 which engages said angled portion 14 to prevent the front cover from being removed without the use of a key for the lock. Hence, all tapes positioned within the modular storage rack can be prevented from being removed by the placement of the locking front cover upon the modular storage rack.

While various proportions in alternate elements or embodiments of the present invention may occur to those skilled in the art, such alternate dimensions, elements, or embodiments, when within the spirit of the present disclosure and scope of the following claims, are considered to be part of the disclosed modular storage rack for tapes of the present invention.

What is claimed is:

1. A modular rack unit for holding a plurality of tapes in tape covers, comprising:

a back;

an upper ledge projecting substantially forwardly from a top portion of the back;

a lower ledge projecting substantially forwardly from a bottom portion of the back and having a plurality of portions thereof cut away, each cut-away portion being sized so that a finger can be inserted therethrough;

a runner projecting substantially upwardly from the upper portion of the back;

jaw means projecting substantially downwardly from the bottom portion of the back capable of engaging a runner of an adjacent substantially identical modular rack unit, said jaw means and said runner being sized so as to space the modular rack unit from any adjacent substantially identical modular rack unit when the jaw means of said unit engage the runner of the adjacent unit such that a finger can be inserted between said lower ledge of said unit and the upper ledge of the adjacent unit and into said cut-away portions;

an upper retainer projecting substantially downwardly from the upper ledge and spaced apart from the back by slightly more than the thickness of a tape cover;

a lower retainer projecting substantially upwardly from the lower ledge and spaced apart from the back by slightly more than the thickness of a tape cover;

said upper and lower ledges being spaced apart and said upper and lower retainers being of sizes such that a top of a tape cover may be inserted into a space between the back, the upper ledge and the upper retainer far enough to allow a bottom of the tape cover to pass over a top of the lower retainer, and such that when a tape cover so inserted then is lowered so that the bottom thereof rests on the lower ledge between the back and the lower retainer, the top thereof cannot pass under the upper retainer; and wherein the modular unit is of a length to hold a plurality of tape covers and at least one said cut-away portion is provided for each portion of said length corresponding to the length of a tape cover.

2. The modular rack unit of claim 1, wherein said lower retainer has cut-away portions adjacent to the lower ledge cut-away portions such that each pair of cut-away portions of said lower retainer and said lower ledge together form a single opening.

3. The modular storage rack unit of claim 2, wherein each single opening is arcuate.

4. The modular storage rack unit of claim 1, wherein each cut-away portion comprises a slot located within the plane of the lower ledge, the peripheral portions of the slot being entirely within the space between the lower retainer and the back.

5. The modular storage rack unit of claim 1, further comprising means for stopping tapes from sliding out longitudinal ends of the modular storage rack, said means comprising a ledge located adjacent to each longitudinal end of the modular storage rack.

6. The modular storage rack unit of claim 1, further comprising means for stopping tapes from sliding out longitudinal ends of the modular storage rack, said means comprising a peg extending forwardly from each longitudinal end of the back.

7. The modular storage rack unit of claim 1, wherein an inner peripheral shape of the jaw means substantially corresponds to an outer peripheral shape of the runner.

8. The modular storage rack unit of claim 1, further comprising a front cover which is slidably engageable with the upper and lower retainers.

9. The modular storage rack unit of claim 8, wherein the front cover has a slotted area at an upper edge portion thereof and a slotted area at a lower edge portion thereof for engagement with said upper and lower retainers.

10. The modular storage rack unit of claim 8, wherein the front cover is provided with a means for locking the front cover to the modular storage rack.

11. A storage rack, comprising a plurality of modular storage rack units of claim 1 attached together by connecting the runner on each modular storage rack to the jaw means of an adjacent modular storage rack, thereby stacking one modular storage rack unit upon another modular storage rack unit.

12. The modular rack unit of claim 1, wherein said upper retainer projects substantially downwardly and also forwardly at a slight angle relative to said back.

13. The modular rack unit of claim 12, wherein said angle is about 5°.

* * * * *